(12) United States Patent
Albert et al.

(10) Patent No.: US 6,267,923 B1
(45) Date of Patent: Jul. 31, 2001

(54) LEAD-CALCIUM ALLOYS, PARTICULARLY FOR BATTERY GRIDS

(75) Inventors: Luc Albert, Elancourt; Alain Goguelin, Chateauneuf-En-Thymerais; Jean-Louis Caillerie, Douai, all of (FR)

(73) Assignee: Metaleurop S.A. (FR)

( * ) Notice: Subject to any disclaimer, the term of this patent is extended or adjusted under 35 U.S.C. 154(b) by 0 days.

(21) Appl. No.: 09/125,343

(22) PCT Filed: Feb. 13, 1997

(86) PCT No.: PCT/FR97/00277

§ 371 Date: Nov. 23, 1998

§ 102(e) Date: Nov. 23, 1998

(87) PCT Pub. No.: WO97/30183

PCT Pub. Date: Aug. 21, 1997

(30) Foreign Application Priority Data

Feb. 16, 1996 (FR) .................................... 96 01976

(51) Int. Cl.⁷ ............................ C22C 11/06; H01M 4/68
(52) U.S. Cl. ........................ 420/564; 420/565; 148/400
(58) Field of Search ........................... 148/400; 420/564, 420/565

(56) References Cited

U.S. PATENT DOCUMENTS

| | | | |
|---|---|---|---|
| 2,170,650 | 8/1939 | Bouton et al. | 75/167 |
| 4,137,378 | 1/1979 | Nees et al. | 429/245 |
| 4,233,070 | 11/1980 | McWhinnie . | |
| 4,358,518 | 11/1982 | Matter . | |

FOREIGN PATENT DOCUMENTS

| | | | |
|---|---|---|---|
| 1117794 | * 2/1982 | (CA) . | |
| 2611575 | 3/1976 | (DE) | C22C/11/02 |
| 2619113 | 5/1976 | (DE) | C22C/11/02 |
| 2921290 | 5/1979 | (DE) | C22C/11/02 |
| 0040951 | 12/1981 | (EP) | C22C/11/06 |
| 851686 | 2/1939 | (FR) | C22C/11/02 |
| 2341660 | 1/1977 | (FR) | C22C/11/06 |
| 1304095 | 2/1970 | (GB) | C22C/11/02 |
| 1597270 | 5/1978 | (GB) | C22C/11/02 |
| 4358034 | * 12/1992 | (JP) . | |

OTHER PUBLICATIONS

Journal of Power Sources, vol. 33, (1981), No. 1–4, pp. 13–20.
Protest under 37 CFR 31.291 filed on Aug. 2, 2000.*

* cited by examiner

*Primary Examiner*—Sikyin Ip
(74) *Attorney, Agent, or Firm*—Blakely Sokoloff Taylor & Zafman (57) ABSTRACT

A lead alloy for battery grids is disclosed. The lead alloy contains calcium with a relative concentration by weight of between 0.05% and 0.12%; tin with a relative concentration by weight of less than 3%; aluminum with a relative concentration by weight of between 0.002% and 0.04%; and barium comprising a relative concentration by weight of less than 0.02%.

21 Claims, 7 Drawing Sheets

Photo 1
0.075% Ca/0% Ba/Pb
0h at 60°C

FIG. 7

Photo 2
0.075% Ca/0.016% Ba/Pb
0h at 60°C

FIG. 8

Photo 3
0.075% Ca/0% Ba/Pb
290h at 60°C

FIG. 9

Photo 4
0.075% Ca/0.016% Ba/Pb
290h at 60°C

FIG. 10

LEAD-CALCIUM ALLOYS, PARTICULARLY FOR BATTERY GRIDS

BACKGROUND OF THE INVENTION

1. Field of the Invention

The present invention relates to lead-calcium-aluminum alloys used mainly in the manufacture of lead-acid battery grids of which so-called "maintenance-free" start-up batteries are composed.

2. Background Information

For some twenty years, the substitution of antimony with calcium and with tin in the lead making up these grids has led to a growing number of storage batteries of longer life and having a negligible consumption of electrolyte being put on the automobile market.

This is because calcium gives lead very useful mechanical properties and tin, while also hardening the lead, favors better energy transfer during the repeated charging/discharging cycles that the battery undergoes throughout its life.

Lead-calcium (Pb—Ca) and lead-calcium-tin (Pb—Ca—Sn) alloy manufacturers also add a small amount of aluminum intended to protect the baths for producing the alloy from extensive oxidation, which consumes mostly calcium at the expense of lead.

Lead-calcium-aluminum (Pb—Ca—Al) alloys, with or without tin, are used for manufacturing negative grids for batteries, while lead-calcium-aluminum-tin (Pb—Ca—Al—Sn) alloys are used for manufacturing positive grids.

The manufacture of a storage battery is a succession of a large number of operations, some of which are carried out between 60 and 80° C. over periods ranging from twenty-four to forty-eight hours. These operations allow the alloy and the active substance to be given all the properties which they will subsequently have to have in order for the battery to operate correctly.

The development of new continuous processes for manufacturing battery grids has, moreover, given rise to a recent requirement for new materials meeting the specifications of new casting and expanding machines and allowing the production of positive or negative grids of high quality.

In the case of negative grids, the tendency is to develop lead-calcium-aluminum alloys having low contents of tin which rapidly hardens over time, thereby making it possible to increase the productivity of casting machines. They must furthermore have mechanical properties superior to those of the previous generation, so as to allow a reduction in the thickness of the grid and therefore a reduction in the weight of the battery without concomitantly impairing the mechanical integrity of the negative plate.

In the case of positive grids, the tendency is to develop lead-calcium-aluminum-tin alloys resistant to the corrosion and passivation phenomena which occur in the positive plate. They must also have a sufficiently high hardness or tensile strength so as to withstand, throughout the lifetime of the battery, the mechanical stresses which are exerted in the positive plate.

In point of fact, the manufacture of positive and negative battery grids requires special attention during the first step of pasting. During this operation, the freshly cast grid must in fact be sufficiently rigid not to deform under the pressure of applying the lead oxide paste which will fill the grid. Since the family of lead-calcium-aluminum-tin alloys is known for its room-temperature hardening properties, the rapidity of the kinetics of which process may vary, the battery manufacturer's know-how and that of his supplier are constantly being applied in order to optimize the efficiency and the quality of the manufacture. One method consists in providing temporary storage of the grids (individual grids or a set of rolls) so as to allow the hardening phenomenon time to develop. The use of a lead alloy having rapid hardening kinetics should allow the time for storing the grids to be reduced.

However, deformation, or even final fracture, of grids during their use in a battery remains one of the main quality problems with which battery manufacturers are confronted. This problem, which is particularly sensitive in the case of positive grids subjected to high mechanical and chemical stresses (corrosion in a sulfuric medium) requires the development of alloys which exhibit good corrosion resistance in a sulfuric medium and have mechanical properties which are high and remain constant over time.

However, it is recognized that one of the simplest means of reducing the sensitivity of thin battery grids to grain-boundary corrosion is to use, in their manufacture, alloys which solidify in a crystallographic structure containing small grains, since this type of structure is reputed to be less sensitive to grain-boundary corrosion.

In order to solve these problems, the addition of barium in lead-calcium-tin alloys has already formed the subject of prior studies mentioned, for example, in Patents FR-A-851,686, DE-2,611,575, DE-2,619,113, EP-A-040,951, DE-2,921,290, GB-1,597,270 and GB-1,304,095. However, although it is actually mentioned that the presence of barium substantially improves the mechanical integrity of cast grids (mechanical strength and creep strength) while not degrading their corrosion behavior, the relative barium contents by weight proposed are always greater than 0.025%. For example, from 0.05 to 0.5% barium is found in the case of DE-2,619,113 and DE-2,611,575; from 0.026 to 0.044% as a complete calcium substitute is found in the case of GB-1,597,270 and DE-2,921,290; and from 0.025 to 0.1% barium with, systematically, strontium between 0.15 and 0.4% and a calcium content of from 0.03 to 0.04% are found in the case of EP-A-040,951 and/or are combined with other additions (magnesium and lithium).

Incidentally, it may be pointed out that Patent FR-A-851,686 recommends an alloy having very high barium contents for producing railroad bearings. For example, it refers to a lead-calcium-barium alloy containing from 0.1% to 2% calcium, from 0.5% to 10% tin and from 0.02% to 0.1% barium. This patent mentions that this alloy has very good corrosion resistance properties in organic medium (oils).

The only reference to alloys having low barium contents is found in GB-1,304,095 which mentions, generally, the beneficial effects of adding from 0.001 to 1% barium, but in an alloy not containing calcium.

An exhaustive study of the prior documents shows that most of the studies carried out in the past related to alloys with or without calcium and having high barium contents (greater than 0.02%).

SUMMARY OF THE INVENTION

The Applicant has discovered, surprisingly and unexpectedly, that, by decreasing the barium content, the properties of these alloys were radically improved compared with the known alloys, especially with regard to their speed of hardening, their high hardness and their ability to retain mechanical properties which are constant over time.

The present invention thus provides novel alloys of the aforementioned type, in which the relative barium concentration by weight is less than 0.02%.

More specifically, the present invention thus provides a lead alloy for lead-acid battery grids containing calcium, with a relative concentration by weight of between 0.05% and 0.12%, tin, with a relative concentration by weight of less than 3%, aluminum, with a relative concentration by weight of between 0.002% and 0.04% and barium, characterized in that the relative concentration by weight of barium is less than 0.02%.

A lead alloy according to the invention, having a relative concentration by weight of tin of less than 0.75% and a relative concentration by weight of barium of between 0.0015% and 0.015%, so as to obtain rapidly hardening alloy, is preferably intended for negative grids.

The role of the barium in this family of alloys is to appreciably speed up the hardening kinetics immediately after casting and to substantially increase the maximum hardness of the alloy.

A lead alloy according to the invention, having a relative concentration by weight of tin of between 0.75% and 1.5% and a relative concentration by weight of barium of between 0.0015% and 0.02% is preferably intended for positive grids.

Advantageously, the relative concentration by weight of calcium is between 0.06 and 0.085% and the relative concentration by weight of tin is between 0.9 and 1.4%.

The addition of barium to this second family of alloys allows the metal to retain high mechanical properties throughout the lifetime of the battery and is conducive, during solidification, to the formation of a fine crystalline structure.

According to the invention, the alloy may furthermore contain bismuth with a relative concentration by weight of between 0.001% and 0.025% or else silver with a relative concentration by weight of less than 0.005% and preferably of between 0.0005% and 0.005%.

The presence of bismuth or silver is not troublesome and has no effect on the hardness of the alloy.

The invention also relates to the lead-acid battery grids comprising a part made of a lead alloy described above, as well as to the lead-acid batteries comprising at least one of these grids.

The following description, with reference to the figures and to the examples appended hereto, which compare the properties of the same alloy with and without barium doping, will make it easier to understand how the invention may be realized. These examples illustrate the excellent properties of PbCaSnAl alloys containing small amounts of barium as opposed to the same alloys without barium.

BRIEF DESCRIPTION OF THE DRAWINGS

Other aspects, objects and advantages of the present invention will become clearer on reading the following detailed description, given with reference to the appended drawings, in which.

DERAILED DESCRIPTION OF THE INVENTION

EXAMPLES

Alloys of the PbCaAl and PbCaSnAl family, optionally doped with barium, are prepared. The Vickers hardness of these alloys is measured as a function of the barium concentration. Finally, these hardness measurements are compared in the case of a family of alloys according to the barium concentration.

The alloys are produced in the following manner:

Commercial second-melting alloys are used as the base alloy. The relative composition by weight of these alloys is given in Tables I and II. So-called soft (first-melting) lead is added. Its composition is given in Table III. Also added are 19% Sn/Pb, 0.4% Ba/Pb and 0.14% Ca/0.13% Ba/Pb master alloys, depending on the case.

In all the tables, the compositions are expressed in relative percentages by weight.

All these components are mixed at a temperature of between 550 and 600° C. in air until casting.

The alloys are cast in the form of 130 mm×70 mm×3 mm plates in a copper mold, the initial temperature of which is room temperature.

Chemical analysis of these plates, especially barium analysis, was systematically checked using spark spectroscopy calibrated by Pb—Ba alloys having very low barium contents.

For each composition, the variation in the Vickers hardness after solidification is measured over a so-called aging period. This aging takes place at 20° C., over periods ranging from 0 to 6600 hours (h), in the case of rapidly hardening alloys and at 60° C., over periods ranging from 0 to 400 h, in the case of alloys intended for the production of positive grids. The 20° C. aging phases simulate the phases during which the grids are cooled and stored after casting but before pasting. The 60° C. aging phases reproduce industrial pasting, ripening and forming conditions and allow artificial simulation of the phenomena which occur in positive plates during the lifetime of a battery.

The results obtained on the rapidly hardening alloys are given in Tables IV to VII below. All the percentages expressed in these tables are also relative percentages by weight, while the Vickers hardness, expressed in Hv2 units, was measured for a 2 kg load.

Table IV gives the Vickers hardnesses (Hv2) of the 0.065% Ca/0.008% Al/Pb alloy variously doped with barium, for different aging times at 20° C.

Table V gives the Vickers hardnesses (Hv2) of the 0,099% Ca/0.008% Al/Pb alloy variously doped with barium, for different aging times at 20° C.

Table VI gives the Vickers hardnesses (Hv2) of the 0.099% Ca/0.6% Sn/0.008% Al/Pb alloy variously doped with barium, for different aging times at 20° C.

Table VII gives the Vickers hardnesses (Hv2) of various x % Ca/0.008% Al/Pb alloys, with various calcium contents (x), doped with 0.015% barium or undoped, after 288 h or 6600 h at 20° C.

For each of Tables IV, V, VI and VII, it may be noticed that:
  the hardness of the alloys is always higher in the presence of barium (between 0.002% and 0.02%) than in the absence of barium;
  the hardness of the alloys may reach 20 Hv2 in the presence of barium;
  the hardness always increases more rapidly with aging time at 20° C. in the presence of barium (between 0.002% and 0.015%) than in the absence of barium;
  the alloys doped with barium retain very high hardnesses even after particularly long aging times (6600 h, i.e. 275 days).

These tables illustrate the excellent properties of the PbCaSnAl alloys according to the invention in terms of hardness and hardening rate.

Figure 1:
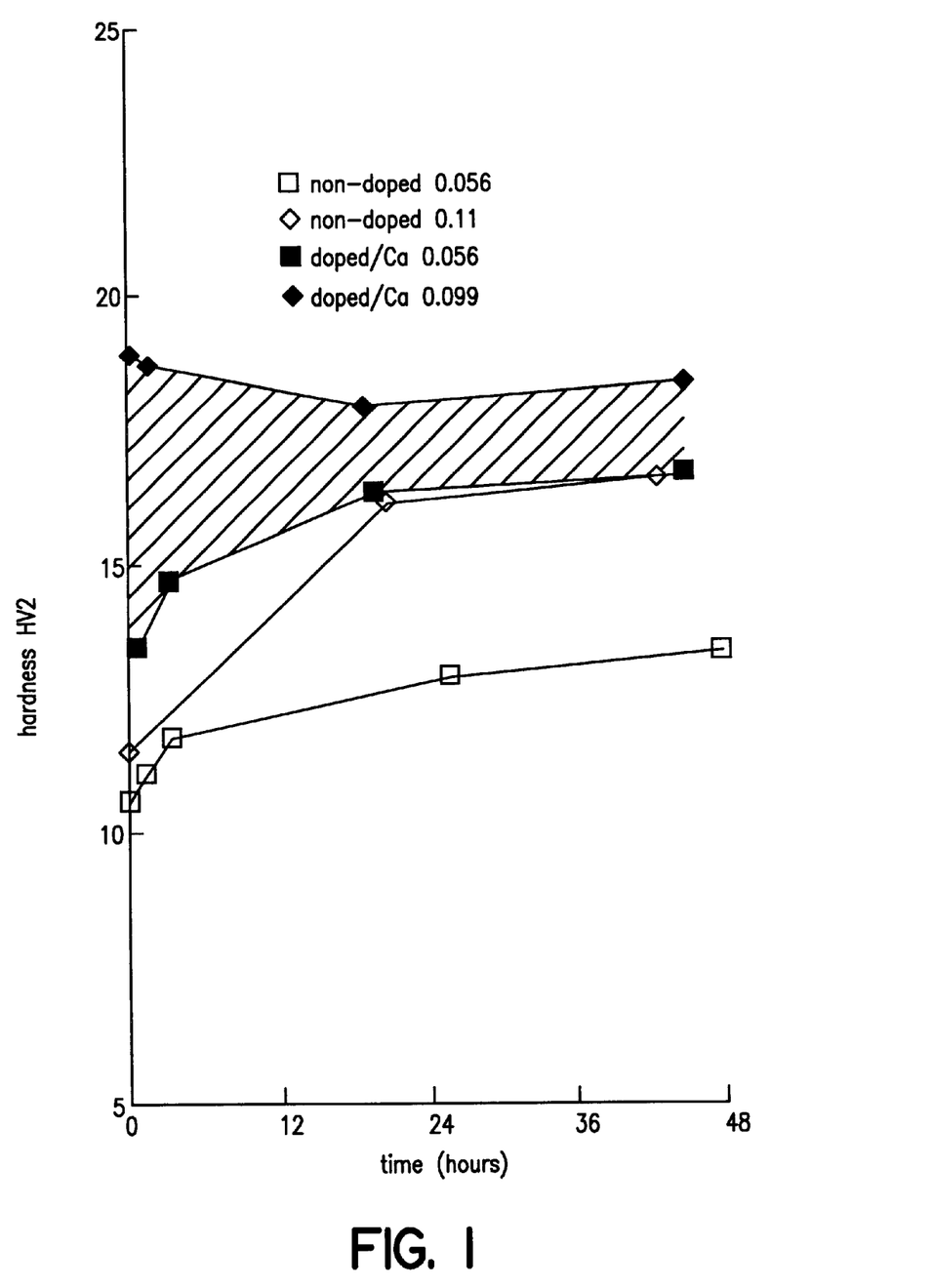
FIG. 1 illustrates the variation in the Vickers hardness as a function of time, at 20° C., in the case of PbCaAl alloys which contain 0.056% and 0.099% calcium and are doped with 0.004% barium or undoped.
Figure 2:
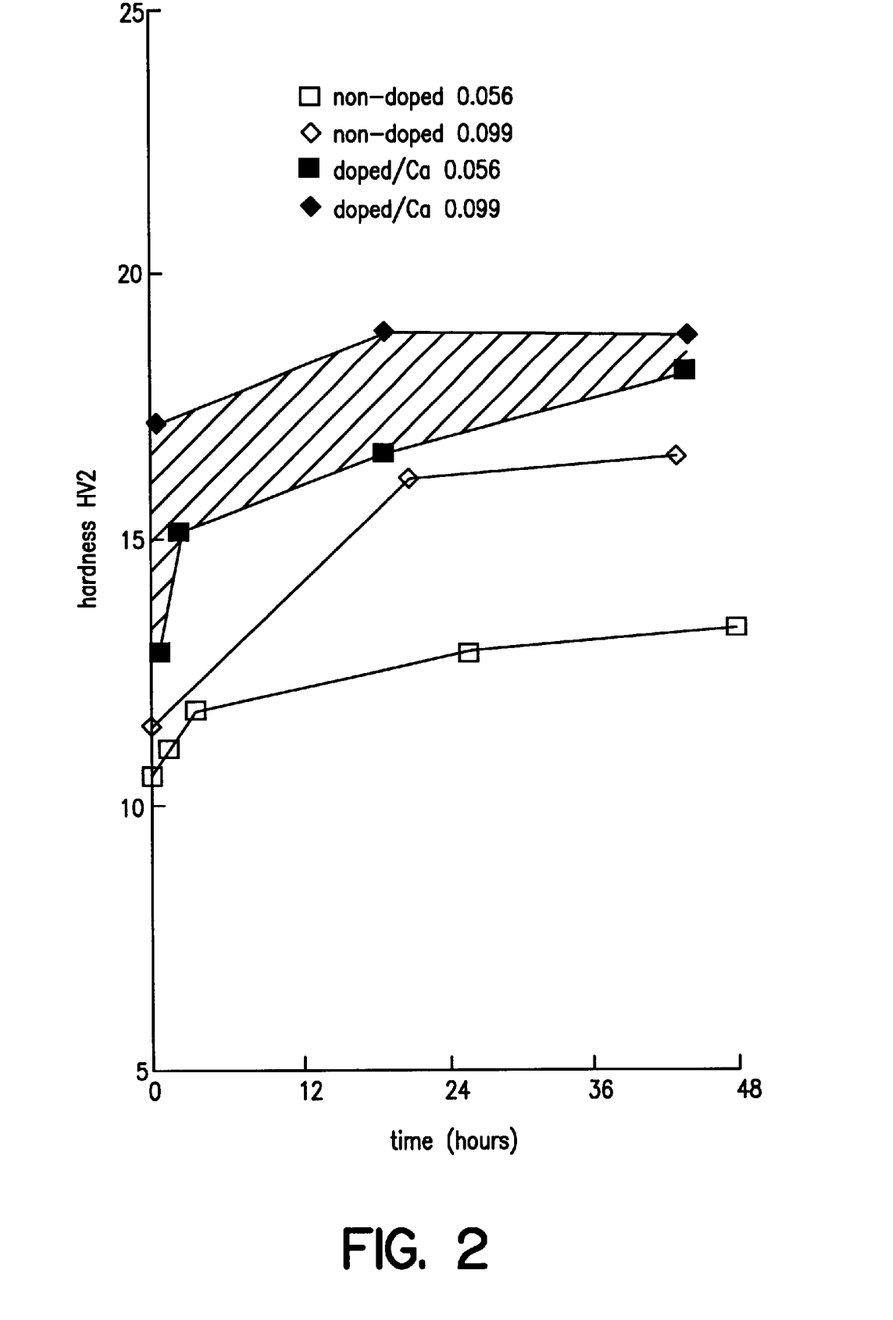
FIG. 2 illustrates the variation in the Vickers hardness as a function of time, at 20° C., in the case of PbCaAl alloys which contain 0.0566 and 0.0996 calcium and are doped with 0.007% barium or undoped.
Figure 3:
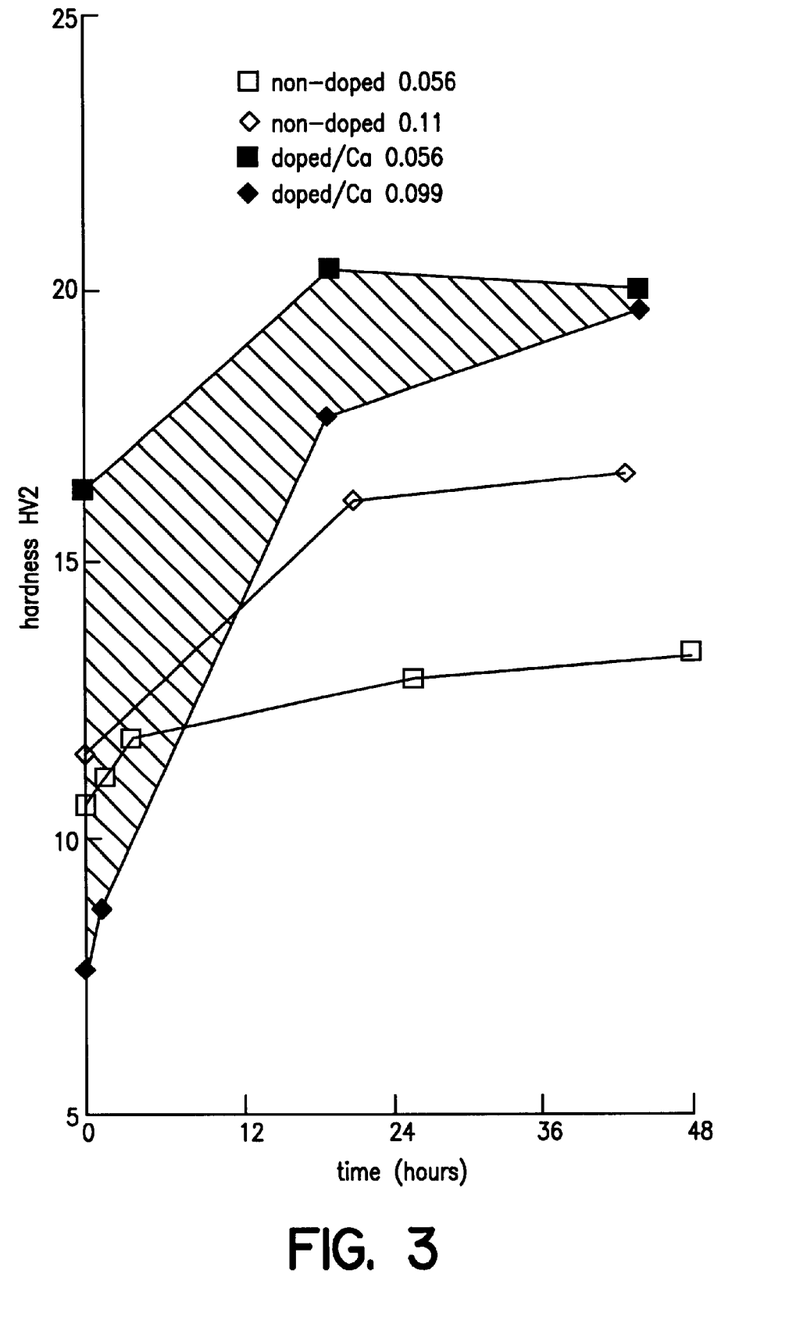
FIG. 3 illustrates the variation in the Vickers hardness as a function of time, at 20° C., in the case of PbCaAl alloys which contain 0.056% and 0.099% calcium and are doped with 0.013% barium or undoped.

FIGS. 1 to 3 show the variation in the Vickers hardness as a function of time for two PbCaSnAl alloys in the case in which the alloy is doped with barium or undoped.

In each of these figures, the symbols when open correspond to undoped alloys and when solid correspond to doped alloys.

In FIGS. 1 to 3, it is clear that when the alloys are in accordance with the characteristics of the present invention, the addition of small amounts of Ba makes it possible:
  to increase the initial hardness of the alloy,
  to increase the maximum hardness of the alloy,
  to speed up the hardening kinetics of the alloy.

It follows that the addition of barium to the PbCaSnAl alloys according to the invention has the effect both of increasing the initial and maximum hardnesses of the alloys intended for the production of battery grids and of speeding up the hardening kinetics of the alloys, thereby making it possible to reach the minimum hardness necessary for the pasting operation more rapidly.

The results obtained on the alloys intended for the production of positive grids are given in Tables VIII to XI below. All the percentages expressed in the tables are percentages by weight. The Vickers hardness, expressed in Hv2 units, was measured for a 2 kg load while the tensile tests were carried out with a pull rate of 10 mm/min.

Table VIII gives the Vickers hardnesses (Hv2) of the 0.06% Ca/1.2% Sn/0.008% Al/Pb alloy variously doped with barium, for different aging times at 60° C.

Table IX gives the Vickers hardnesses (Hv2) of the 0.075% Ca/1.2% Sn/0.008% Al/Pb alloy variously doped with barium, for different aging times at 60° C.

Table X gives the Vickers hardnesses (Hv2) of the 0.085% Ca/1.2% Sn/0.008% Al/Pb alloy variously doped with barium, for different aging times at 60° C.

Table XI gives the tensile strength $R_m$ (MPa) measured in tensile tests on specimens of the 0.075% Ca/1.2% Sn/0.008% Al/Pb alloy variously doped with barium, for different aging times at 60° C.

Again for all these tables, the concentrations are relative concentrations by weight.

It may be noted in Tables VIII, IX, X and XI that:
  the hardness of the alloys, immediately after casting, is higher in the presence of barium (between 0.002% and 0.018%) than in the absence of barium;
  the hardness of the alloys goes through a maximum and then decreases in the absence of barium, but increases and remains stable at a high level in the presence of barium;
  the tensile strength of the alloys goes through a maximum and then decreases in the absence of barium, but increases and remains stable at a high level in the presence of barium;
  the maximum hardness may reach 23 Hv2 in the presence of barium;
  the tensile strength may reach 60 MPa in the presence of barium.

These tables illustrate the excellent properties of the PbCaSnAl alloys in terms of hardness, tensile strength, hardening rate and stability over time when their concentrations are in accordance with the characteristics of the present invention.

Figure 4:
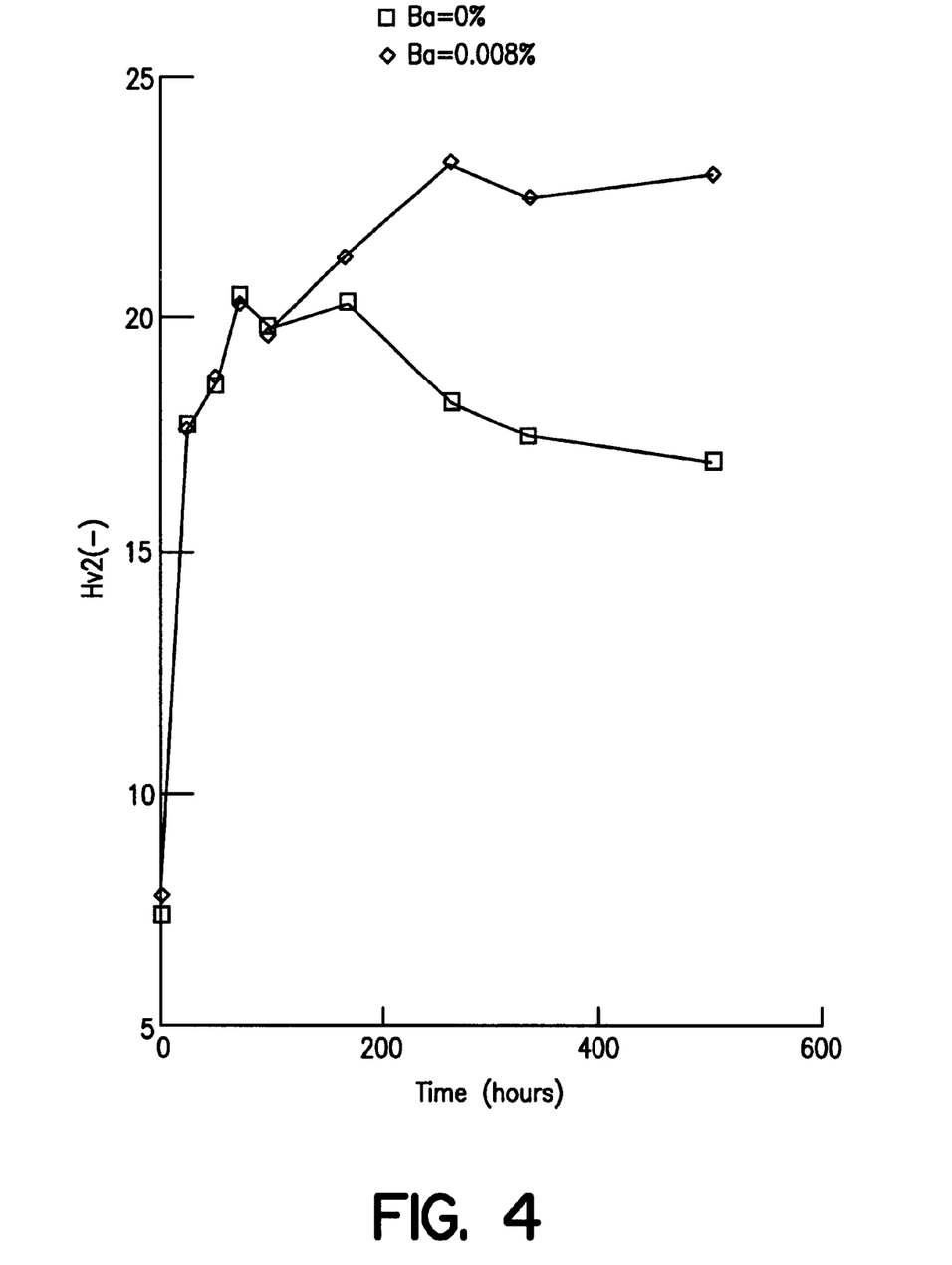
FIG. 4 illustrates the variation in the Vickers hardness as a function of time, at 60° C., in the case of PbCaSnAl alloys which contain 0.06% calcium and 1.2% tin and are doped with 0.008% barium or undoped.
Figure 5:
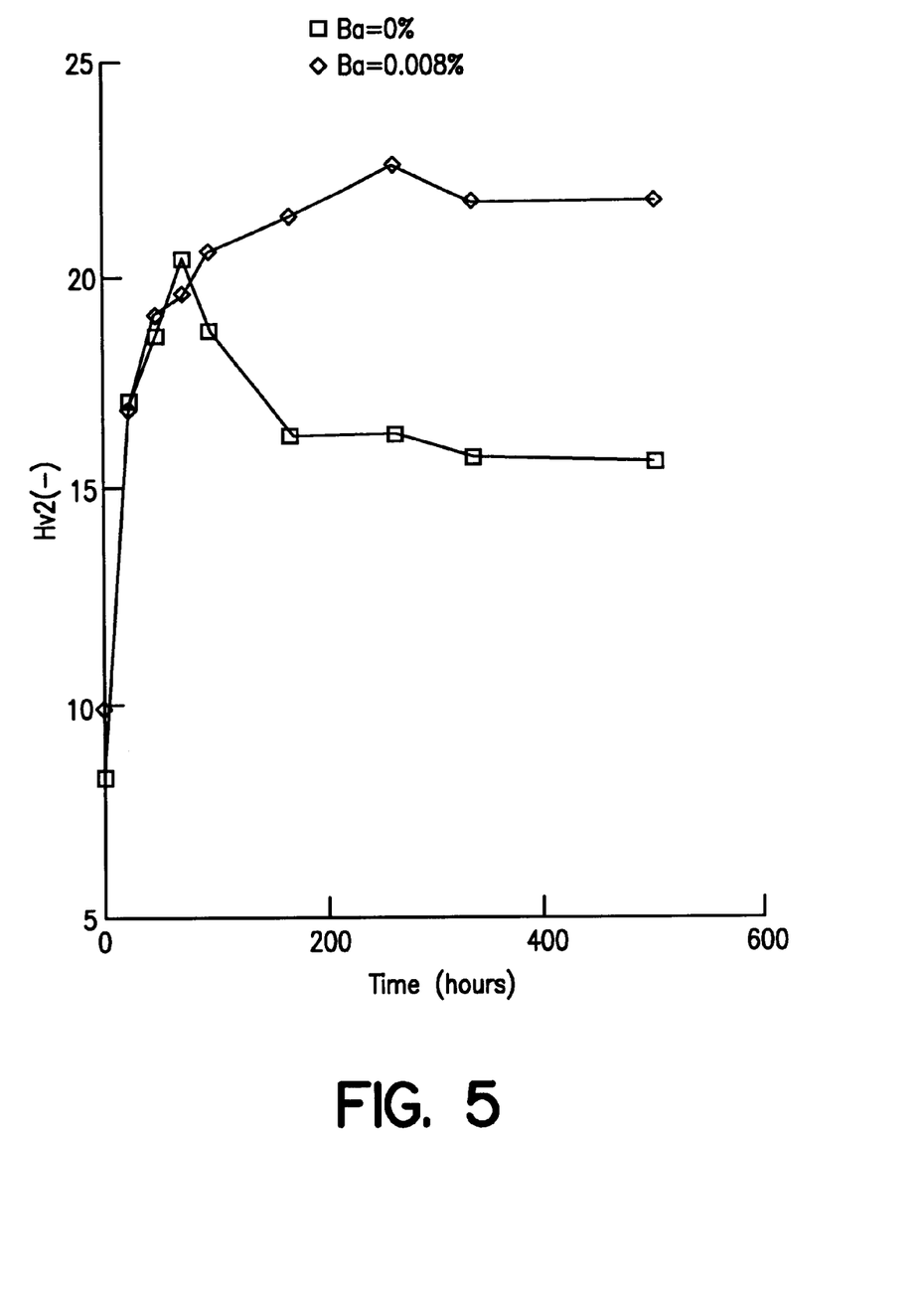
FIG. 5 illustrates the variation in the Vickers hardness as a function of time, at 60° C., in the case of PbCaSnAl alloys which contain 0.075% calcium, 1.2% tin and are doped with 0.008% barium or undoped.
Figure 6:
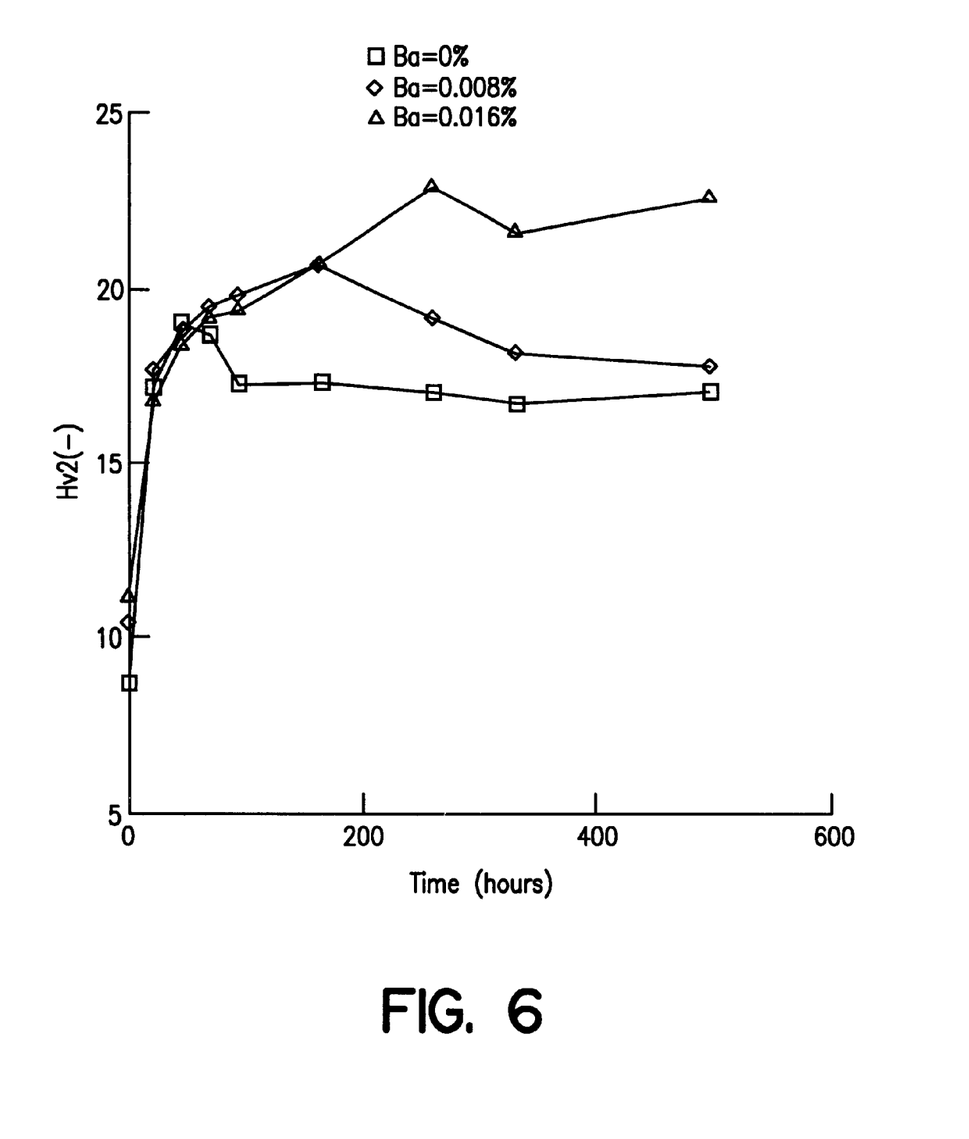
FIG. 6 illustrates the variation in the Vickers hardness as a function of time, at 60° C., in the case of PbCaSnAl alloys which contain 0.085% calcium, 1.2% tin and are doped with 0.008% and 0.016% barium or undoped.

Each of FIGS. 4 to 6 shows, in the case of a PbCaSnAl alloy, the variation in the Vickers hardness as a function of time depending on whether or not the alloy is doped with Ba.

In each of these figures, the symbols, when open, correspond to undoped alloys and when solid correspond to doped alloys.

It is apparent in FIGS. 4 to 6, that, when the alloys are in accordance with the invention, the addition of small amounts of barium makes it possible:
  to increase the initial hardness of the alloy at the time t=0;
  to stabilize, over time, the hardness and the tensile strength of the alloy to a high value.

Figure 7:
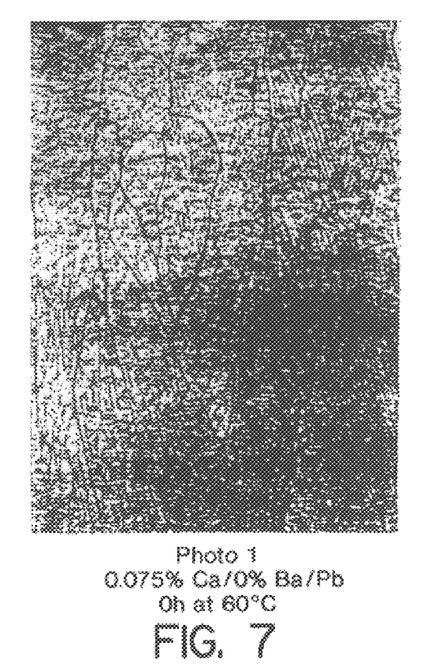
FIG. 7 illustrates the microstructures of 0.75% Ca/1.2% Sn/0.008% Al/Pb alloys doped with 0.0.16% barium immediately after casting.
Figure 8:
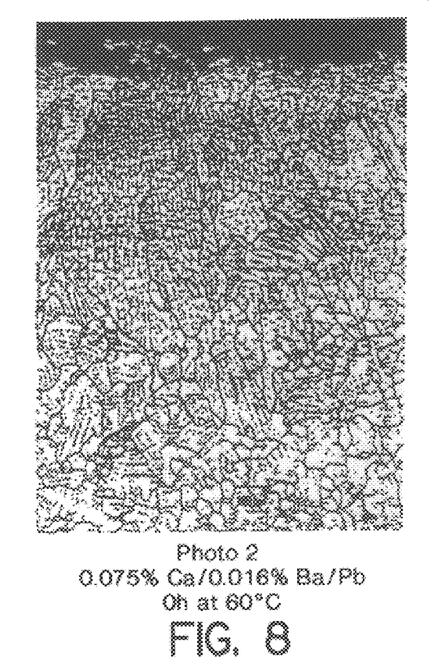
FIG. 8 illustrates the microstructures of 0.75% Ca/1.2% Sn/0.008% Al/Pb alloys (undoped) immediately after casting.
Figure 9:
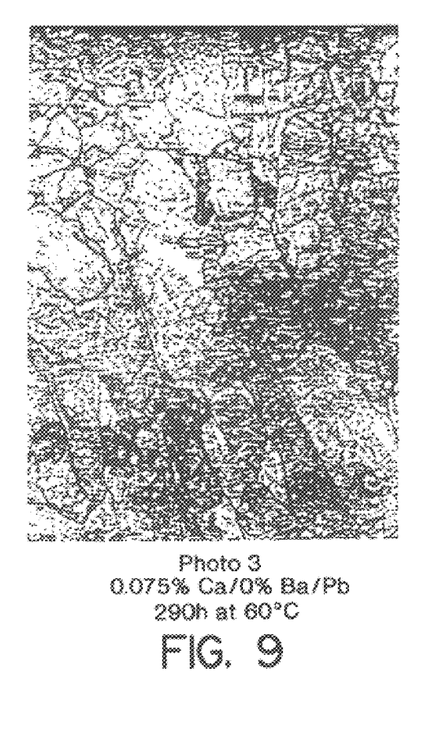
FIG. 9 illustrates the microstructures of the polished sections removed from an alloy plate.
Figure 10:
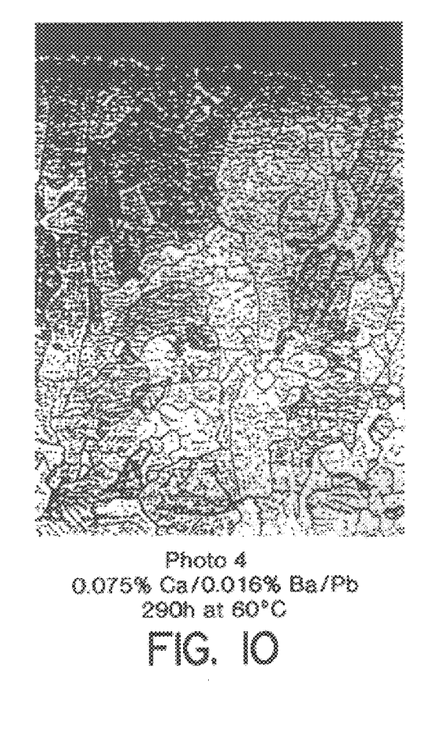
FIG. 10 illustrates the microstructures of the polished sections removed from an alloy plate.

Photographs such as those shown in FIGS. 7 through 10 show the microstructures of 0.075% Ca/1.2% Sn/0.008% Al/Pb alloys, doped with 0.016% barium or undoped, immediately after casting (FIGS. 7 and 8) and after an aging time of 270 h at 60° C. (FIGS. 9 and 10). These photos were taken on polished sections removed from the same alloy plate cast at 600° C. in a 3 mm thick copper mold.

In each of these photos, the black band at the top of the photo corresponds to the end of the plate in contact with the mold.

By comparing the photographs shown in FIG. 7 with FIG. 8 and FIG. 9 with FIG. 10, it is clear that, when the alloys are in accordance with the characteristics of the present invention, the addition of small amounts of barium makes it possible:
  to transform the coarse-grained cast structure characteristic of this type of alloy into a finer-grained structure (Photos 1 and 2);
  to eliminate the so-called averaging or lamellar-precipitation phenomenon within the grains, this being clearly visible in the alloys not containing barium (Photos 3 and 4);
  to promote the formation of a finer-grained crystallographic structure which remains stable over time (FIGS. 9 and 10).

It follows that the alloys according to the invention contain an amount of barium which has the effect both of increasing the initial hardness of the alloy and of making the PbCaSnAl alloy less sensitive to the averaging phenomena which are manifested by a transformation of the crystallographic structure of the alloy and by a drop in mechanical properties of the alloy over time.

Although the Applicant does not have at the present time a complete theoretical explanation and does not favor any one argument, it may be stated that the excellent results obtained on the PbCaSnAl alloys appear, in the case of barium contents, below the solubility limit in soft lead. It is therefore possible that a synergy exists between calcium and barium, the latter, possibly, being better able to help in distributing the calcium supersaturation in the plumbiferous matrix, thereby improving the hardening process of the alloy. This synergy would only appear when the barium is in solid solution, i.e. when its content is less than the solubility limit, i.e., according to J. L. Dawson ("The Electrochemistry of Lead", Ed. Kuhn, Academic Press, 1979, p. 309), 0.02% at 25° C. in soft lead.

TABLE I

Composition of one of the commercial base alloys

| Element | Minimum content | Maximum content | | |
|---|---|---|---|---|
| Silver | — | 0.0050 | Ag | (%) |
| Bismuth | — | 0.0300 | Bi | (%) |
| Arsenic | — | 0.0020 | As | (%) |
| Cadmium | — | 0.0010 | Cd | (%) |
| Copper | — | 0.0050 | Cu | (%) |
| Nickel | — | 0.0020 | Ni | (%) |
| Antimony | — | 0.0010 | Sb | (%) |
| Tin | — | 0.0500 | Sn | (%) |
| Zinc | — | 0.0010 | Zn | (%) |
| Tellurium | — | 0.0010 | Te | (%) |
| Selenium | — | | Se | (%) |
| Sulfur | — | | S | (%) |
| Calcium | 0.1000 | 0.1400 | Ca | (%) |
| Aluminum | 0.0150 | 0.0250 | Al | (%) |
| Sodium | — | | Na | (%) |
| Magnesium | — | | Mg | (%) |
| Iron | — | 0.0050 | Fe | (%) |
| Cobalt | — | | Co | (%) |

TABLE II

Composition of one of the commercial base alloys

| Element | Minimum content | Maximum content | | |
|---|---|---|---|---|
| Silver | — | 0.0040 | Ag | (%) |
| Bismuth | — | 0.0180 | Bi | (%) |
| Arsenic | — | 0.0030 | As | (%) |
| Cadmium | — | 0.0010 | Cd | (%) |
| Copper | — | 0.0005 | Cu | (%) |
| Nickel | — | 0.0020 | Ni | (%) |
| Antimony | — | 0.0010 | Sb | (%) |
| Tin | 0.5500 | 0.6500 | Sn | (%) |
| Zinc | — | 0.010 | Zn | (%) |
| Tellurium | — | 0.0010 | Te | (%) |
| Selenium | — | | Se | (%) |
| Sulfur | — | | S | (%) |
| Calcium | 0.1000 | 0.1200 | Ca | (%) |
| Aluminum | 0.0100 | 0.0200 | Al | (%) |
| Sodium | — | | Na | (%) |
| Magnesium | — | | Mg | (%) |
| Iron | — | 0.0005 | Fe | (%) |
| Cobalt | — | | Co | (%) |

TABLE III

Composition of the so-called first-melting soft lead

| Element | Minimum content | Maximum content | | |
|---|---|---|---|---|
| Silver | — | 0.0010 | Ag | (%) |
| Bismuth | — | 0.0100 | Bi | (%) |
| Arsenic | — | 0.0001 | As | (%) |
| Cadmium | — | 0.0003 | Cd | (%) |
| Antimony | — | 0.0003 | Sb | (%) |
| Tin | — | 0.0003 | Sn | (%) |
| Zinc | — | 0.0010 | Zn | (%) |

TABLE III-continued

Composition of the so-called first-melting soft lead

| Element | Minimum content | Maximum content | | |
|---|---|---|---|---|
| Copper | — | 0.0010 | Cu | (%) |
| Iron | — | 0.0010 | Fe | (%) |

TABLE IV 0.065% Ca/0% Sn/0.008% Al/Pb

Hv2 (aging at 20° C.)

| Time (h) | Ba = 0% | Ba = 0.0015% | Ba = 0.004% | Ba = 0.007% |
|---|---|---|---|---|
| 0.25 | 11.7 | — | 11.5 | 10.5 |
| 2.5 | 12.3 | 15.4 | 15.2 | 16.0 |
| 23 | 13.7 | 15.9 | 18.7 | 16.6 |
| 45 | 14.8 | 16.7 | 18.3 | 17.9 |

TABLE V 0.099% Ca/0% Sn/0.008% Al/Pb

Hv2 (aging at 20° C.)

| Time (h) | Ba = 0% | Ba = 0.0015% | Ba = 0.006% | Ba = 0.008% |
|---|---|---|---|---|
| 0.25 | 11.7 | 18.9 | 17.2 | 17.2 |
| 2 | — | 18.7 | 16.4 | 16.1 |
| 21 | 16.2 | 18.0 | 17.5 | 17.5 |
| 48 | 16.7 | — | 17.5 | 16.8 |

TABLE VI 0.0990% Ca/0.6% Sn/0.0080% Al/Pb

Hv2 (aging at 20° C.)

| Time (h) | Ba = 0% | Ba = 0.003% | Ba = 0.006% | Ba = 0.02% |
|---|---|---|---|---|
| 0.25 | 13.3 | 17.6 | 17.7 | 12.5 |
| 5 | 14.4 | 17.3 | 18.1 | 12.2 |
| 24 | 15.4 | 17.2 | 18.5 | — |
| 48 | 16.0 | 18.4 | 18.5 | — |
| 75 | — | — | — | 15.7 |
| 250 | 18.0 | 19.2 | 21.0 | 17.8 |
| 1000 | — | 21.5 | 22.6 | — |

TABLE VII x% Ca/0% Sn/0.0080% Al/Pb

| | Ba = 0% | | | Ba = 0.0150% | | |
|---|---|---|---|---|---|---|
| Ca (%) Time (h) Temperature (° C.) | Hv2 <1h at 20° C. | Hv2 288h at 20° C. | Hv2 6600h at 20° C. | Hv2 <1h at 20° C. | Hv2 288h at 20° C. | Hv2 6600h at 20° C. |
| 0.0550 | 11.0 | 13.2 | 12.5 | 9.0 | 20.0 | 16.6 |
| 0.0650 | 12.0 | 14.8 | 13.1 | 15.0 | 20.9 | 17.2 |
| 0.0750 | 12.0 | 16.1 | 14.6 | 16.0 | 20.7 | 17.5 |
| 0.0850 | 13.0 | 17.5 | 14.9 | 18.0 | 21.2 | 17.9 |
| 0.1000 | 14.0 | 15.6 | 14.1 | 18.0 | 21.0 | 17.7 |

TABLE VIII 0.06% Ca/1.2% Sn/0.008% Al/Pb

| Time (h) | Hv2 (aging at 60° C.) | | | |
|---|---|---|---|---|
| | Ba = 0% | Ba = 0.004% | Ba = 0.008% | Ba = 0.015% |
| 0 | 7.4 | 8.6 | 7.8 | 8.8 |
| 24 | 17.7 | 16.3 | 17.6 | 17.7 |
| 48 | 18.5 | 18.7 | 18.7 | 17.9 |
| 72 | 20.4 | 20.2 | 20.2 | 20.0 |
| 96 | 19.8 | 20.0 | 19.6 | 20.5 |
| 168 | 20.3 | 21.3 | 21.2 | 20.2 |
| 264 | 18.2 | 20.2 | 23.2 | 21.9 |
| 336 | 17.5 | 21.0 | 22.5 | 22.3 |
| 504 | 17.0 | 21.6 | 23.0 | 23.6 |

TABLE IX 0.075% Ca/1.2% Sn/0.008% Al/Pb

| Time (h) | Hv2 (aging at 60° C.) | | | |
|---|---|---|---|---|
| | Ba = 0% | Ba = 0.004% | Ba = 0.008% | Ba = 0.016% |
| 0 | 8.3 | 8.8 | 9.9 | 10.7 |
| 24 | 17.1 | 17.1 | 16.9 | 17.9 |
| 48 | 18.6 | 19.3 | 19.1 | 18.7 |
| 72 | 20.4 | 19.9 | 19.6 | 19.7 |
| 96 | 18.8 | 19.7 | 20.6 | 21.3 |
| 168 | 16.3 | 20.5 | 21.4 | 21.6 |
| 264 | 16.3 | 18.6 | 22.6 | 23.2 |
| 336 | 15.8 | 17.6 | 21.8 | 23.2 |
| 504 | 15.7 | 16.7 | 21.8 | 23.2 |

TABLE X 0.0850% Ca/1.2% Sn/0.0080% Al/Pb

| Time (h) | Hv2 (aging at 60° C.) | | | |
|---|---|---|---|---|
| | Ba = 0% | Ba = 0.0040% | Ba = 0.0080% | Ba = 0.0160% |
| 0 | 8.7 | 9.2 | 10.4 | 11.2 |
| 24 | 17.2 | 17.7 | 17.7 | 16.9 |
| 48 | 19.0 | 18.6 | 18.7 | 18.5 |
| 72 | 18.7 | 18.6 | 19.5 | 19.2 |
| 96 | 17.3 | 17.9 | 19.8 | 19.4 |
| 168 | 17.3 | 18.2 | 20.6 | 20.7 |
| 264 | 17.0 | 17.2 | 19.1 | 22.8 |
| 336 | 16.7 | 16.9 | 18.1 | 21.6 |
| 504 | 17.1 | 16.6 | 17.7 | 22.5 |

TABLE XI 0.0750% Ca/1.2% Sn/Pb
Mechanical properties of alloys for positives

| Ba (%) | Hv2 (−) 0h at 60° C. | $R_m$ (MPa) 0h at 60° C. | Hv2 (−) 72h at 60° C. | $R_m$ (MPa) 72h at 60° C. | Hv2 (−) 290h at 60° C. | $R_m$ (MPa) 290h at 60° C. |
|---|---|---|---|---|---|---|
| 0 | 8.3 | 20.0 | 20.4 | 50.3 | 16.3 | 40.7 |
| 0.0037 | 8.8 | 22.3 | 19.9 | 50.0 | 18.6 | 51.3 |
| 0.0086 | 9.9 | 20.0 | 19.6 | 49.7 | 22.6 | 56.0 |
| 0.0166 | 10.7 | 22.7 | 19.7 | 50.0 | 23.2 | 60.0 |

What is claimed is:

1. Lead alloy for lead-acid battery grids consisting essentially of calcium having a concentration by weight between 0.05% and 0.12%, tin, having a concentration by weight less than 3%, aluminum, having a concentration by weight between 0.002% and 0.04% and barium, characterized in that the concentration by weight of barium is in the range of 0.0015% to 0.02%.

2. Lead alloy according to claim 1, wherein the relative concentration by weight of tin is less than 0.75% and the relative concentration by weight of barium is between 0.0015% and 0.015%, so as to obtain a rapidly hardening alloy intended for negative grids.

3. Lead alloy according to claim 1, wherein the relative concentration by weight of tin is between 0.75% and 1.5% and the relative concentration by weight of barium is between 0.0015% and 0.02%, this alloy being intended for positive grids.

4. Lead alloy according to claim 3, wherein the relative concentration by weight of calcium is between 0.06% and 0.085% and the relative concentration by weight of tin is between 0.9% and 1.4%.

5. Lead alloy according to any one of claims 1 to 4, further comprising bismuth with a relative concentration by weight of between 0.001% and 0.025%.

6. Lead alloy according to claim 1, further comprising silver with a relative concentration by weight of less than 0.005%.

7. Lead-acid battery grid, which comprises a part made of a lead alloy according to claim 1.

8. Lead-acid battery, characterized in that it comprises at least one grid according to claim 7.

9. Lead alloy according to claim 1, further comprising silver with a relative concentration by weight in the range of 0.0005% to 0.005%.

10. Lead alloy according to claim 2, further comprising silver with a relative concentration by weight of less than 0.005%.

11. Lead alloy according to claim 3, further comprising silver with a relative concentration by weight in the range of 0.0005% to 0.005%.

12. Lead alloy according to claim 4, further comprising silver with a relative concentration by weight in the range of 0.0005% to 0.005%.

13. Lead alloy according to claim 5, further comprising silver with a relative concentration by weight in the range of 0.0005% to 0.005%.

14. Lead-acid battery grid, which comprises a part made of a lead alloy according to claim 1.

15. Lead-acid battery grid, which comprises a part made of a lead alloy according to claim 2.

16. Lead-acid battery grid, which comprises a part made of a lead alloy according to claim 3.

17. Lead-acid battery grid, which comprises a part made of a lead alloy according to claim 4.

18. Lead-acid battery grid, which comprises a part made of a lead alloy according to claim 5.

19. Lead-acid battery grid, which comprises a part made of a lead alloy according to claim 6.

20. Lead-acid battery grid, which comprises a part made of a lead alloy according to claim 7.

21. Lead-acid battery grid, which comprises a part made of a lead alloy according to claim 8.

* * * * *

UNITED STATES PATENT AND TRADEMARK OFFICE
CERTIFICATE OF CORRECTION

PATENT NO.    : 6,267,923 B1
DATED         : July 31, 2001
INVENTOR(S)   : Albert et al.

It is certified that error appears in the above-identified patent and that said Letters Patent is hereby corrected as shown below:

Drawings,
Figure 2, please delete "0.0566 and 0.0996" and insert -- 0.0566% and 0.0996% --.

Signed and Sealed this

Twenty-seventh Day of July, 2004

JON W. DUDAS
*Acting Director of the United States Patent and Trademark Office*